May 12, 1970     SHIN-KIEN CHOW     3,511,257
VORTEX TYPE THROTTLING VALVE APPARATUS
Filed Sept. 12, 1968
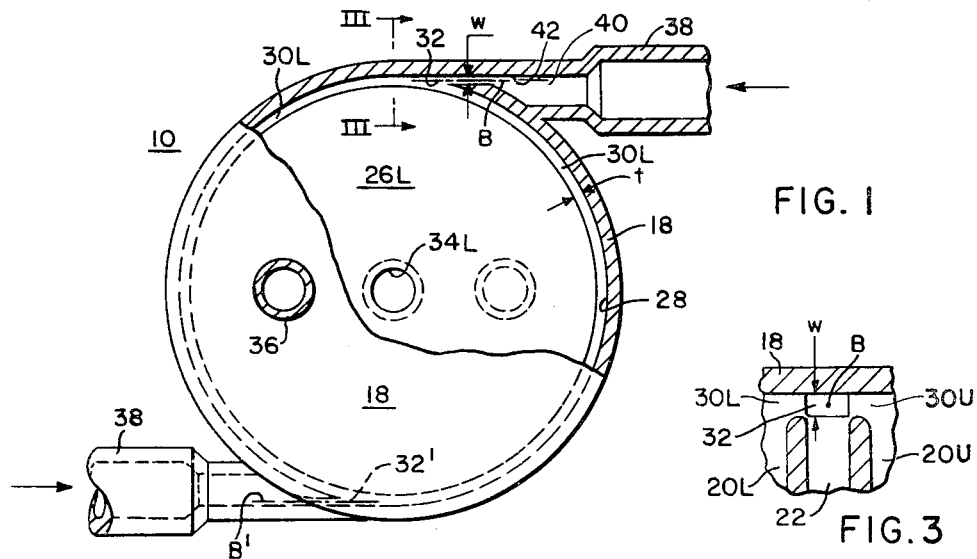
FIG. 1
FIG. 3
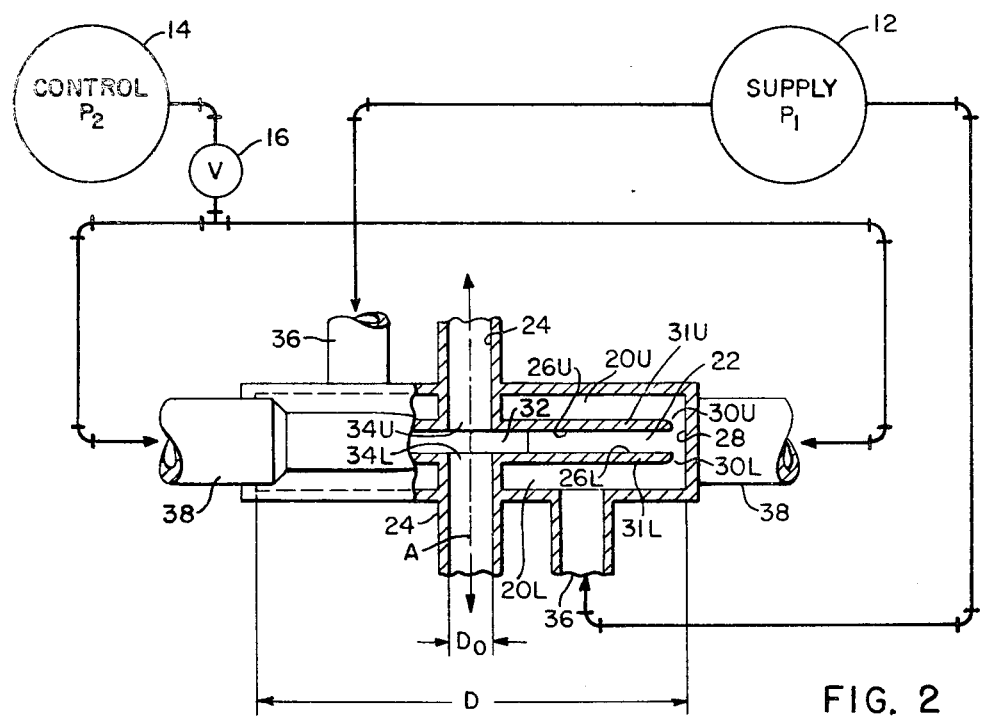
FIG. 2
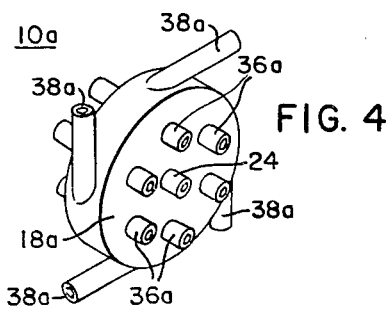
FIG. 4
INVENTOR
Shin-Kien Chow
BY
Michael F. Ogle
ATTORNEY

United States Patent Office 3,511,257
Patented May 12, 1970

3,511,257
VORTEX TYPE THROTTLING VALVE APPARATUS
Shin-Kien Chow, Monroeville, Pa., assignor to Westinghouse Electric Corporation, Pittsburgh, Pa., a corporation of Pennsylvania
Filed Sept. 12, 1968, Ser. No. 759,289
Int. Cl. F15c 1/16
U.S. Cl. 137—81.5                                         3 Claims

ABSTRACT OF THE DISCLOSURE

An improved fluidic throttling valve of the vortex type. A disc-shaped vortex chamber is supplied from a plenum chamber arrangement including chamber sections to one and the other axial sides of the vortex chamber. The supply-flow is communicated from the plenum chamber sections to the vortex chamber by annular slits extending continuously around the total periphery of the vortex chamber. Tangential streams of control-flow are introduced along the peripheral wall of the vortex chamber between the confronting slits.

BACKGROUND OF THE INVENTION

This invention relates to fluidic throttling valve apparatus for controlling flow of a supply fluid by means of a much smaller flow of control fluid. More particularly it relates to so-called "vortex valve" devices in which the centrifugal effects of a vortex produced by the control fluid is used in controlling the large flow of supply fluid.

A variety of constructions and arrangments of vortex valves have been heretofore proposed. As far as known, none have been adopted for practical use. A major impediment to their practical use has been limitations of the so-called turndown ratio characteristic. The turndown ratio is defined as the volumetric flow rate of the supply flow without swirl (zero control flow) divided by the volumetric flow rate of control flow that is barely able to prevent the supply flow. The teachings of the prior art have been that the maximum turndown ration capability of vortex valves is approximately 7:1. See the text book "Fluidics," Fluid Amplifier Association Inc., Boston, Mass., 1965.

Obviously, it is also desirable that a vortex valve operate with low control-supply pressure ratios.

SUMMARY OF THE INVENTION

A vortex valve housing is cylindrically shaped having a disc-shaped vortex chamber at its axial center. A pair of central exhaust ports are formed in one and the other transverse walls of the vortex chamber. They communicate to the exterior of the housing through axial conduits.

The supply-flow is first admitted into first and second annular plenum chambers disposed to one and the other axial sides of the vortex chamber. These plenum chambers have portions adjacent the outer periphery of the vortex chamber. First and second annular slits, which are contiguous to the outer periphery of the vortex chamber, communicate the vortex chamber and one and the other adjacent plenum chambers. These slits, which extend continuously about the entire periphery of the vortex chamber, form the supply-flow inlets into the vortex chamber. The control-flow is introduced into the vortex chamber through two or more tangential nozzle-inlets which open into the periphery of the vortex chamber.

Objectives of the present invention include provision of:

(1) An improved vortex valve having a high turndown ratio capability; and
(2) A vortex valve in accordance with previous objective which operates effectively with small control-supply pressure ratios.

BRIEF DESCRIPTION OF THE DRAWING

FIG. 1 is a partially cutaway top elevation of a vortex valve;

FIG. 2 is a partially cutaway side elevation of the device of FIG. 1, including a diagrammatic of associated fluid sources and feed lines;

FIG. 3 is an enlarged section taken along line 3—3, of FIG. 1; and

FIG. 4 is a perspective view of a modification of the invention.

DESCRIPTION OF PREFERRED EMBODIMENT

Referring now to FIGS. 1 and 2 of the drawing, a vortex type throttling valve 10 controls the flow rate from a source 12 of supply liquid or gas under a predetermined fixed pressure $P_1$. Control actuation is produced employing a control source 14 of the same liquid or gas under a predetermined pressure $P_2$ higher than $P_1$. Control variation is obtained by a valve 16 in the control liquid line.

Vortex valve 10 comprises a cylindrical housing 18. The housing has an axis of revolution A, and its axial width is less than its diameter. Within the housing 18 are formed three axial chambers consisting of an upper plenum chamber 20U, a lower plenum chamber 20L and a vortex chamber 22 therebetween. The plenum chambers are annular, their centers being occupied by axial exhaust conduits 24. Vortex chamber 22 is disc-shaped, being formed between upper and lower planar transverse wall faces 26U, 26L and a peripheral wall 28. Vortex chamber 22 has a pair of supply-flow inlets 30U, 30L, formed as annular slits between the outer peripheral edges of the chamber divider walls 31U, 31L and the peripheral wall 28 of the vortex chamber. A pair of tangential control-flow inlets 32, 32' open into vortex chamber 22 at diametrically opposed positions of the peripheral wall. Exhaust apertures 34U, 34L, which are the inlet openings to exhaust conduits 24, are formed in transvere wall faces 26U, 26L.

Liquid from supply source 12 is delivered to upper and lower plenum chambers 20U, 20L through inlet conduits 36. The supply liquid fills the plenum chambers including their outer portions, which constitute supply zones for annular inlets 30U, 30L, leading into the vortex chamber.

From the outlet side of valve 16, the control-flow is communicated to tangential inlets 32, 32', through inlet conduits 38. The inlet conduits first lead into a convergent or nozzle section 40 having rectangular cross section. The passage narrows to a radial thickness $w$, FIGS. 1 and 3. The narrow end of the nozzle section opens into the vortex chamber in a manner in which its outside lateral wall 42 tangentially merges with the surface of peripheral wall 28 of the vortex chamber. This configuration of inlet has an effective axis B, which is in tangential relationship to the vortex chamber.

Vortex throttling valve 10 is operated as follows. When a control-flow from control source 14 is introduced tangentially into the chamber, the angular momentum of this flow will drive the fluid in the chamber to become a vortex. This vortex flow produces a centrifugal force field that has the effect of retarding the supply flow. Hence the supply flow will decrease as the rate of control-flow is increased. When the circulation strength of this vortex is sufficient to produce a peripheral pressure that is equal to or larger than the total pressure of the supply flow, the latter will be prevented completely. Thus adjustment of the control-flow, by valve 16, provides throttling control of the supply flow.

Valve 10a FIG. 4 is a modification allowing control of relatively higher flow quantities. Increased capacity is obtained by provision of a large multiplicity of inlet conduits 36a entering the plenum chambers from each face of housing 18a. Four tangential inlet conduits 38a enter the circumferential surface of the housing at right angle positions. One successful construction of valve 10a used a vortex chamber having an inside diameter=8 inches, and an inside thickness=1 inch. All inlets were designed for ¾ inch conduit couplings. This construction yielded a maximum supply flow of approximately 60 gallons per minute (g.p.m.) at small $P_1:P_2$ ratios, of the order of 1.1.

The invention has been described with central outlet apertures in both of the transverse walls of the vortex chamber. The use of two outlets instead of one contributes in significant measure to its high turn-down ratio characteristics. However, if desired, a single outlet located on one side may be used with somewhat reduced turn-down ratio effectiveness.

An important feature of the invention is that the configuration of the supply-flow inlets 30U, 30L, and the configuration of the tangential control-flow inlets 32 enable high flow turn-down ratio characteristics.

A series of tests were conducted employing the 60 g.p.m. construction described in conjunction with vortex valve 10a, FIG. 4.

In one of these tests the vortex valve had further dimensional characteristics as follows: $D/D_o=8.93$, where D (FIG. 2) is the diameter of vortex chamber and $D_o$ (FIG. 2) is the diameter of each outlet aperture 34. $w/D=0.0625$ where W is the radial width $w$ (FIGS. 2 and 3) of an individual tangential inlet multiplied by the number of such inlets. A control-supply pressure ratio of 1.1 resulted in a turn-down ratio=10.4. (The ratio $t/D$ was 0.0163, where $t$, FIG. 1, is the radial thickness of annular slots 30. However, it was found in comprehensive testing that this ratio is not critical.)

In another test the vortex valve had the following characteristics: $D/D_o=8.93$, $W/D=0.0107$. A control-supply ratio of 2.0 resulted in a turn-down ratio=18.0.

The present valve has been exhaustively tested and analyzed and found to operate in accordance with the teachings of this invention over wide ranges of dimensional ratios and a wide range of pressure ratios. Tests have confirmed such operation over the following ranges: $D/D_o=4.00$ to 8.93; $W/D=0.0078$ to 0.0625; control-supply pressure ratio=1.1 to 12.0. Within these ranges at least, increasing any of these ratios increases the characteristic turn-down ratio of the valve.

Also, although described on the environment of liquids and gases generally, the invention could be used in conjunction with the large sized conduit systems for hot pressurized steam in conjunction with steam turbines. A present problem in this field is the requirement for the control of flows in large sized conduits, which may be as large as 24 inches in diameter. The size and cost of "moving part" valving for these conduit sizes tends to become prohibitive. One feature of the invention which makes it attractive for such applications is the absence of moving parts. Another feature is the fact that the valve has been found effective at least down to a chamber-outlet ratio, $D/D_o=4.0$. Assuming that the diameter of the outlet aperture, $D_o$, will be of the same order as the conduit size, this ratio indicates that the present invention would result in valving structures no larger than those of "moving part" valves.

While the present invention has been described with a certain degree of particularity, it should be understood that various modifications and changes thereof will be readily apparent and can be made within the scope and spirit of the present invention.

I claim as my invention:

1. Vortex valve apparatus for controlling a supply fluid under a first predetermined supply pressure in response to a control fluid under a second predetermined pressure greater than the first predetermined pressure, comprising;

(a) a housing means forming a disc-shaped vortex chamber and forming first and second plenum chambers disposed to one and the other axial sides of the vortex chamber, said vortex chamber being bounded by a confronting pair of transverse walls and by an outer peripheral wall, the supply fluid plenum chambers each having an annular portion adjacent to the outer periphery of the vortex chamber, (b) a first annular slit communicating with the first supply fluid plenum chamber and the vortex chamber, said first annular slit forming an opening in the adjacent transverse wall of the vortex chamber at a loci contiguous to the peripheral wall, (c) a second annular slit communicating the second supply fluid plenum chamber and the vortex chamber, said second annular slit forming an opening in the adjacent transverse wall of the vortex chamber at a loci contiguous to the peripheral wall, (d) control fluid inlet means for tangentially introducing said control fluid into the vortex chamber along the outer peripheral wall thereof, and (e) outlet means disposed centrally in the vortex chamber.

2. Vortex valve apparatus in accordance with claim 1, with;

(f) said control fluid inlet means comprising a plurality of inlet conduits opening into the peripheral wall at positions equiangularly spaced about the vortex chamber axis.

3. Vortex valve apparatus in accordance with claim 1, with;

(g) said outlet means comprising first and second outlet orifices formed in confronting relationship to one another in the opposite axial faces of the vortex chamber.

References Cited

UNITED STATES PATENTS

| | | | |
|---|---|---|---|
| 3,395,720 | 8/1968 | Brooks | 137—81.5 |
| 3,424,182 | 1/1969 | Mayer | 137—81.5 |
| 3,447,383 | 6/1969 | Camarata | 137—81.5 X |

M. CARY NELSON, Primary Examiner

W. R. CLINE, Assistant Examiner